United States Patent
Lee

(10) Patent No.: US 8,194,287 B2
(45) Date of Patent: Jun. 5, 2012

(54) APPARATUS AND METHOD TO REVISE HALFTONED IMAGE AND IMAGE FORMING APPARATUS USING THE SAME

(75) Inventor: Hae-kee Lee, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 720 days.

(21) Appl. No.: 11/969,371

(22) Filed: Jan. 4, 2008

(65) Prior Publication Data

US 2009/0027731 A1    Jan. 29, 2009

(30) Foreign Application Priority Data

Jul. 24, 2007   (KR) ................ 10-2007-0074021

(51) Int. Cl.
*H04N 1/405* (2006.01)
(52) U.S. Cl. ............................ 358/3.15; 358/3.27
(58) Field of Classification Search ........ 358/3.13–3.18, 358/1.9, 2.1, 3.06, 3.09, 3.26–3.27; 382/237, 382/266–269
See application file for complete search history.

(56) References Cited

U.S. PATENT DOCUMENTS

| | | | | |
|---|---|---|---|---|
| 4,667,250 A * | 5/1987 | Murai | | 358/3.13 |
| 5,341,224 A * | 8/1994 | Eschbach | | 358/3.27 |
| 7,450,270 B2 * | 11/2008 | He et al. | | 358/3.2 |
| 7,586,650 B2 * | 9/2009 | Washio | | 358/3.15 |
| 7,733,534 B2 * | 6/2010 | Murakami | | 358/3.13 |
| 2005/0002588 A1 * | 1/2005 | Fan | | 382/264 |
| 2005/0030586 A1 * | 2/2005 | Huang et al. | | 358/2.1 |

* cited by examiner

*Primary Examiner* — Thomas D Lee
*Assistant Examiner* — Stephen M Brinich
(74) *Attorney, Agent, or Firm* — Staas & Halsey LLP

(57) ABSTRACT

An apparatus and a method to revise a halftoned image and an image forming apparatus using the same. The apparatus includes an area dividing unit to detect a boundary edge area of an image, a halftoning unit to convert the image to a halftoned image, and a dot rearranging unit to rearrange dots of the boundary area to sharpen the boundary area.

17 Claims, 4 Drawing Sheets

APPARATUS AND METHOD TO REVISE HALFTONED IMAGE AND IMAGE FORMING APPARATUS USING THE SAME

CROSS-REFERENCE TO RELATED APPLICATION

This application claims benefit of Korean Application No. 2007-74021, filed Jul. 24, 2007, in the Korean Intellectual Property Office, the disclosure of which is incorporated herein by reference.

BACKGROUND OF THE INVENTION

1. Field of the Invention

Aspects of the present invention relate to an apparatus and a method for revising a halftoned image, and an image forming apparatus using the same, and more particularly, to an apparatus and a method for revising a boundary area of a halftoned image, and an image forming apparatus using the same.

2. Description of the Related Art

There is an image forming apparatus that represents a binary-level image, according to output and non-output dots, and there is an imaging apparatus that represents a multi-level image. The binary-level image forming apparatus converts a multi-level representation of an image into binary-level image, which is referred to as halftoning.

Among a variety of halftoning methods, a screening halftoning method is widely applied, particularly in the area of image forming apparatuses. The screening halftoning operates by binarizing gray levels from 0 to 255, of pixels of interest, based on a comparison with a predetermined screen.

According to the dot construction of a screen, a screen is mainly categorized into an amplitude modulated (AM) screen and a frequency modulated (FM) screen. The AM or clustered screen outputs clusters of dots, and provides a relatively more stable output of dots than the FM screen. Accordingly, the AM screen is generally used in image forming apparatuses.

In designing an AM screen, an initial location of a dot center is determined, and dots are grown, centered around the initial location. Therefore, the location of the dot center determines the lines-per-inch (LPI) of the resulting final screen table.

Halftoning generally softens images and details. However, halftoning using an AM screen does not represent details at a boundary area as clearly as using an FM screen.

SUMMARY OF THE INVENTION

Aspects of the present invention provide an apparatus and a method to revise a halftoned image, by enhancing image quality at a boundary area. An image is halftoned separately with respect to an internal area and a boundary (edge) area of the image.

According to an aspect of the present invention, an apparatus to revise a halftoned image is provided. The apparatus may include an area dividing unit to detect a boundary area of an image, a halftoning unit to convert the image to a halftoned image, and a dot rearranging unit to rearrange dots of a boundary area of the halftoned image.

According to an aspect of the present invention, the area dividing unit may divide the image into the boundary area and an internal area.

According to an aspect of the present invention, the halftoning unit may include a boundary area halftoning unit to convert the boundary area of the image to halftones, and an internal area halftoning unit to convert the internal area of the image to halftones.

According to an aspect of the present invention, the boundary area of the halftoned image comprises a colored pixel and an adjacent white pixel; and the dot rearranging unit moves a portion of the dots of the colored pixel to the white pixel.

According to an aspect of the present invention, the apparatus may further include an output unit to output the final image.

According to another aspect of the present invention, a method of revising a halftoned image is provided. The method to revise a halftoned image may include detecting a boundary area of an image, converting the image to halftoned image, and rearranging dots of the boundary area of the halftoned image.

According to an aspect of the present invention, the detecting of the boundary area may include dividing the image into the boundary area and an internal area.

According to an aspect of the present invention, the converting of the image may include converting the boundary area of the image to halftones, and converting the internal area of the image to halftones.

According to an aspect of the present invention, the boundary area of the halftoned image comprises a colored pixel and an adjacent white pixel, and the rearranging of the dots may include moving a portion of the dots from the colored pixel.

According to an aspect of the present invention, the method may further include outputting the final image.

According to yet another aspect of the present invention, an image forming apparatus is provided. The image forming apparatus may include a dot rearranging unit to rearrange dots between a colored pixel and a white pixel of a boundary area of a halftoned image, and a printing unit to print the image having the rearranged dots.

According to an aspect of the present invention, the colored pixel comprises dots of a first color and dots of a second color, and the dot rearranging unit may moves the dots of the first color from the colored to the white pixel.

According to an aspect of the present invention, the portion of the dots comprises dots of the same color.

According to an aspect of the present invention, the portion of the dots comprises dots of different colors.

According to an aspect of the present invention, the image is a color image.

According to an aspect of the present invention, the portion of the dots comprises dots of the same color.

According to an aspect of the present invention, the portion of dots comprises dots of different colors.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
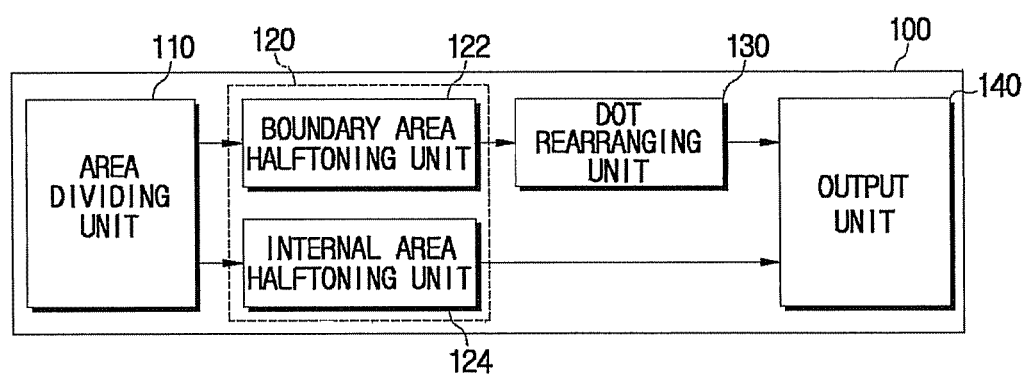
FIG. 1 is a block diagram of a halftoned image revising apparatus, according to an exemplary embodiment of the present invention.

Reference will now be made in detail to the exemplary embodiments of the present invention, examples of which are illustrated in the accompanying drawings, wherein like reference numerals refer to the like elements throughout. The exemplary embodiments are described below, in order to explain the present invention, by referring to the figures.

Referring to FIG. 1, a halftoned image revising apparatus 100, according to an exemplary embodiment of the present invention. The apparatus 100 includes an area dividing unit 110, a halftoning unit 120, a dot rearranging unit 130, and output unit 140. The halftoned image revising apparatus 100 may be an image forming apparatuses, such as, a printer, or a host device installed with a printer driver program.

The area dividing unit 110 divides an input image into internal area and a boundary area. In other words, the area dividing unit detects a boundary area and an internal area of an image. The boundary area includes, for example, a boundary edge between text or an image, and a background. The internal area includes, for example, a portion of text or an image that does not contain an edge.

The halftoning unit 120 performs a halftoning process on an input image, i.e. converts an image into a halftone image. By the halftoning, the black/white contrast of an image is represented by dots. In one exemplary embodiment of the present invention, the halftoning unit 120 uses clustered screening for the halftoning. The halftoning unit 120 can perform the halftoning process for each color of an image, for example.

The halftoning unit 120 includes a boundary area halftoning unit 122, and an internal area halftoning unit 124. The boundary area halftoning unit 122 performs a halftoning operation on a boundary area of an input image, based on the division performed by the area dividing unit 110. The internal area halftoning unit 124 performs halftoning on the internal area, based on the division performed by the area dividing unit 110. While the halftoning unit 120 performs halftoning separately for the boundary area and the internal area, using the boundary area halftoning unit 122 and the internal area halftoning unit 124, both the boundary area halftoning unit 122 and the internal area halftoning unit 124 perform the same halftoning operation.

The dot rearranging unit 130 rearranges dots of the boundary area, determined by the area dividing unit 110, with respect to the image processed by the halftoning unit 120. In other words, the dot rearranging unit 130 rearranges dots between pixels included in the boundary area, of the image processed by the boundary area halftoning unit 122.

The dot rearranging unit 130 rearranges dots of the boundary area, by moving dots from a colored pixel, including different colored dots, to an adjacent white pixel, which does not have any dots. This process will be explained in greater detail below, with reference to FIG. 3.

The output unit 140 outputs the resultant image, after the dot rearrangement by the dot rearranging unit 130. Therefore, in the image output by the output unit 140, the internal area is processed by the internal area halftoning unit 124, the boundary area is processed by the boundary area halftoning unit 122, and the dots are rearranged by the dot rearranging unit 130.

Figure 2:
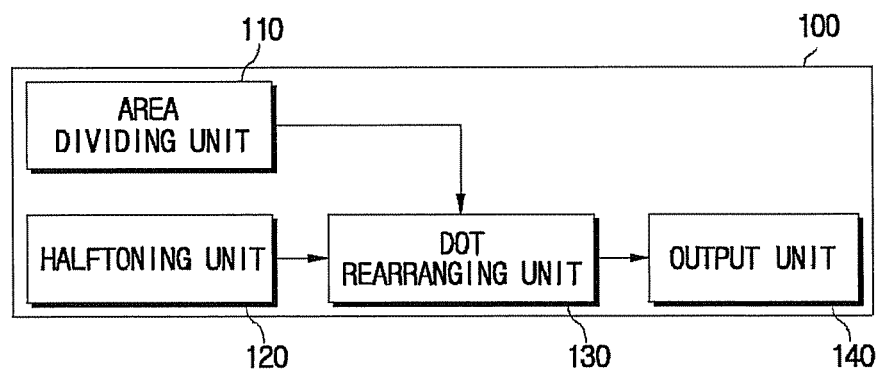
FIG. 2 is a block diagram of a halftoned image revising apparatus, according to an exemplary embodiment of the present invention.

FIG. 2 is a block diagram of a halftoned image revising apparatus 101, according to a second exemplary embodiment of the present invention. Referring to FIG. 2, the halftoned image revising apparatus 101 includes an area dividing unit 110, a halftoning unit 120, a dot rearranging unit 130, and an output unit 140. The halftoned image revising apparatus 101 has a similar construction as that illustrated in FIG. 1, and therefore, the like elements will be referred to by the same reference numerals, throughout.

The area dividing unit 110 divides an input image into an internal area and a boundary area. The area dividing unit 110 provides the dot rearranging unit 130 with the information about the detected internal and boundary areas.

The halftoning unit 120 performs halftoning of the input image. While the first exemplary embodiment explained above divides an input image into the internal and boundary areas, and performs the halftoning separately, the halftoning unit 120, according to another exemplary embodiment, performs a universal halftoning process on all of the areas.

The dot rearranging unit 130 rearranges dots of the boundary area, divided by the area dividing unit 110, in the halftoned image processed by the halftoning unit 120. The dot rearranging unit 130 rearranges the dots of the boundary area in the same manner as explained above. The output unit 140 outputs an image in which dots of a boundary area are rearranged by the dot rearranging unit 130.

Figure 3:
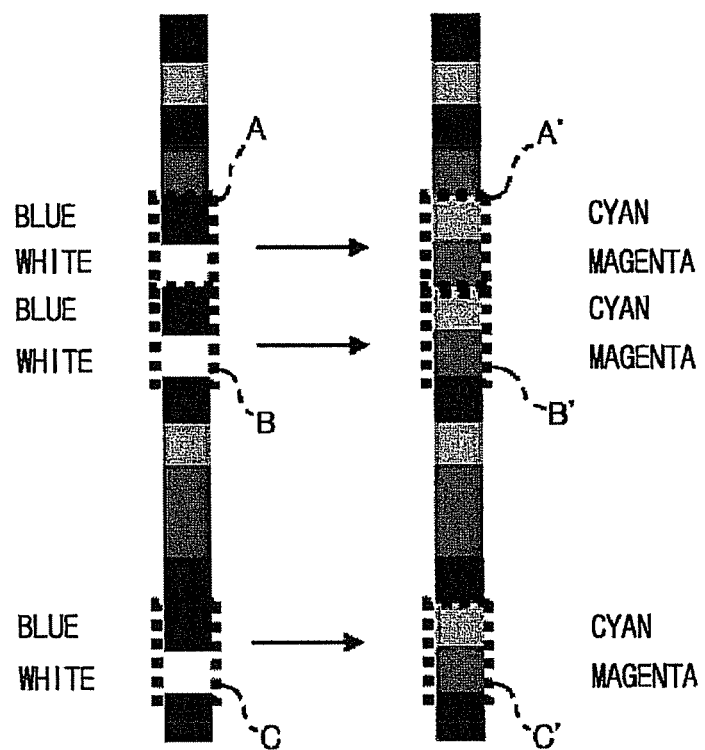
FIG. 3 illustrates a method of revising a boundary area of an image using the halftoned image revising apparatuses of FIGS. 1 and 2.

FIG. 3 illustrates a method of using the halftoned image revising apparatuses 100 and 101, to revise a boundary area of an image. An example of an image forming apparatus adopting a CMYK color system, which mixes cyan and magenta to represent blue (B), will be explained below. However, this specific example should not be understood as limiting.

The number of C and M dots to be placed in a boundary area, to represent a color, is determined, based on a halftoning table. If the number of C and M dots varies, a consistent blue color generally cannot be achieved.

If an image halftoned by the halftoning unit 120 is blue, some pixels have C dots alone, some have M dots alone, and some have both C and M dots together. The number of C and M dots is fixed, so some of the pixels may not have any dots at all. In such a case, the pixel is white color. Herein, the pixels are referred to as encompassing dots and the dots may be circular, rectangular, or any other suitable shape.

FIG. 3 illustrates part of a boundary area of a halftoned image 300. The boundary area has a blue pixel including C and M dots, and a white pixel with no dots. The C and M dots of the blue pixel are overlapped to produce the blue color. As illustrated in FIG. 3, the image 300 has blue, cyan, magenta and white colors appearing in turn. The presence of the white pixels interrupts the continuity of a boundary (edge) of the image.

The dot rearranging unit 130 rearranges the dots of the boundary area of the halftoned image 300, to solve at least the abovementioned problem. The dot rearranging unit 130 reassigns dots from the colored pixels of the boundary area, to adjacent pixels that have comparatively fewer or no dots.

For example, in FIG. 3, white pixels are adjacent to the blue pixels that have overlapping C and M dots. The dot rearranging unit 130 relocates either the C or the M dots from one of the blue pixels to the white pixels.

In FIG. 3, pixel groups A, B, and C each include a white pixel and a blue pixel. Accordingly, the dot rearranging unit 130 may locate white pixels, which include no dots, and neighboring colored pixels, which include a plurality of dots, and pair these pixels as the pixel groups A, B, and C. The dot rearranging unit 130 may then rearrange dots from the colored pixels to the white pixels in each of the pixel groups A, B, and C.

A rearranged image 302 is produced as a result of the dot rearrangement of the A, B, and C pixel groups, by the dot rearranging unit 130. The three white pixels, of the boundary area of the image 300, are filled with dots, as illustrated in the revised groups A', B', and C' of the image 302. The boundary area of the image 302 is, thereby, represented in greater detail (sharpened).

Because the dot rearranging unit 130 relocates the dots of a pixel, to a pixel that does not have any dots, this process does not change the total number of dots, as predetermined in a halftoning table. Therefore, the boundary area of an image is revised, without varying the intended color representation.

While a blue color is recited in the above exemplary embodiment of the present invention, other alternatives are possible. For example, a green color may be used, which is represented as C and Y dots overlapped with each other. In addition, dots of different colors can be moved, from a colored pixel to a white pixel, so long as the number of dots is not substantially changed.

Furthermore, while an example of using a pixel that includes dots of two different colors is explained above in the exemplary embodiment, it is within the scope of the present teachings to use pixels having dots of more than two colors. For example, the dot rearranging unit 130 can rearrange the dots of a pixel having dots of three different colors, by selecting dots of one color, and then rearranging the same into an adjacent white pixel. Alternatively, the dot rearranging unit can move a portion of the dots of the three colors to an adjacent pixel. For example, a quarter, a third, or a half of each type of dot can be relocated.

However, Y dots should generally not be relocated to a white pixel, if a pixel includes a combination of C, M, and Y dots, because yellow is not so distinctive, in comparison with the other colors, and thus, could be less effective in revising (sharpening) the boundary areas.

Figure 4A:
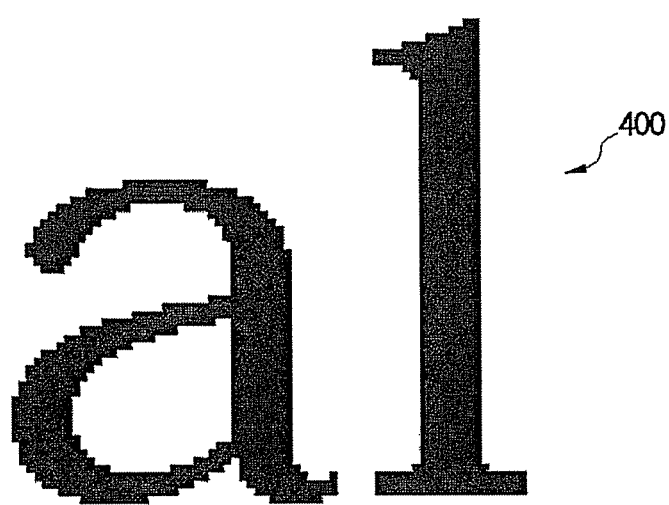
FIGS. 4A to 4C illustrate results of revising the boundary area of an image using the halftoned image revising apparatuses of FIGS. 1 and 2.
Figure 4B:
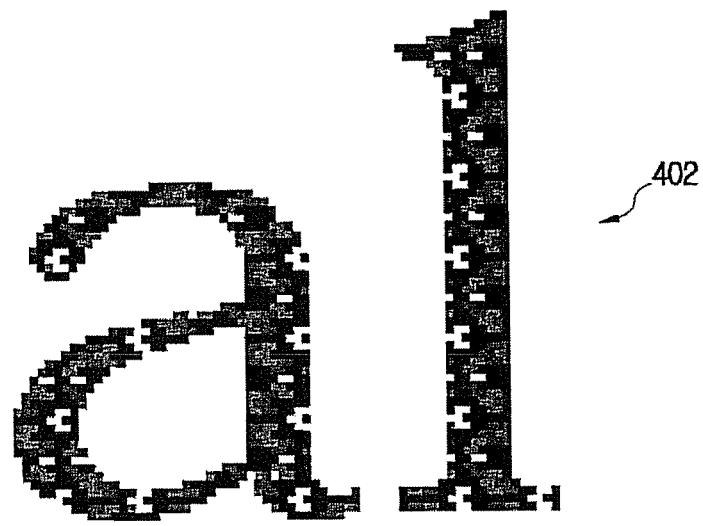
Figure 4C:

FIGS. 4A to 4C illustrate results of revising the boundary area of an image, by the halftoned image revising apparatuses 100 and 101. FIG. 4A illustrates an exemplary original image 400 (or portion thereof that is blue, before any revision is performed.

FIG. 4B illustrates a halftoned image 402 that is produced after halftoning the image 400, using the halftoning unit 120. The image 402 includes cyan, magenta, and white pixels. The image 402 has white pixels formed along a boundary area thereof, resulting in a jagged boundary (edge) that reduces image quality.

FIG. 4C illustrates an image 404, produced by rearranging the dots of the boundary area of the image 402. The image 404 has a smoother boundary (edge), resulting in a higher image quality (a sharpened image). When the dot rearranging unit 130 rearranges the dots of the halftoned image, as explained above with reference to FIG. 3, the image 404 does not have white pixels along the boundary area thereof. In other words, the image 404 is sharpened.

Figure 5:
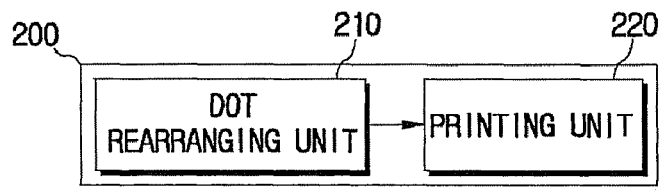
FIG. 5 is a block diagram of an image forming apparatus, according to an exemplary embodiment of the present invention.

FIG. 5 is a block diagram of an image forming apparatus 200, according to an exemplary embodiment of the present invention. Referring to FIG. 5, the image forming apparatus 200 includes a dot rearranging unit 210, and a printing unit 220.

The dot rearranging unit 210 rearranges dots of a boundary area of a halftoned image. The dot rearranging unit 210 operates in the same way as the dot rearranging unit 130, explained above with reference to FIGS. 1 and 2. The printing unit 220 prints an image, after the dot rearranging unit 210 completes the dot rearrangement.

Figure 6:
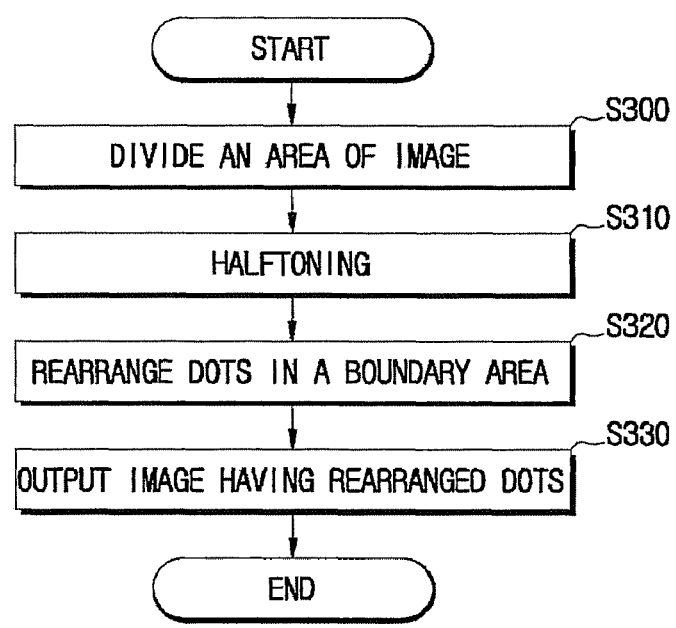
FIG. 6 is a flowchart to explain a halftoned image revising method, according to an exemplary embodiment of the present invention.

FIG. 6 is a flowchart of a halftoned image revising method, according to an exemplary embodiment of the present invention. At operation S300, an image is input to the halftoned image revising apparatus 100, and the area dividing unit 110 divides the input image into internal area and boundary area, by detecting the internal area and the boundary area.

At operation S310, a boundary area halftoning unit 122 performs halftoning on the boundary area, while an internal area halftoning unit 124 performs halftoning on the internal area.

At operation S320, the dot rearranging unit 130 rearranges dots of the halftoned image, so that every pixel in the boundary area 122 represents a color. The dot rearranging unit 130 rearranges the dots, as explained above with reference to FIG. 3, to produce a final image.

At operation S330, the output unit 140 outputs the final image. In the output image, the internal area is halftoned by the internal area halftoning unit 124, the boundary area is halftoned at the boundary area halftoning unit 122, and the dots are rearranged by the dot rearranging unit 130.

A method of revising a halftoned image, using the halftoned image revising apparatus 100, has been explained so far. One will understand that the halftoned image revising apparatus 101, applies a similar revising method, with an exception that the halftoning unit 120 performs a universal halftoning process, with respect to the internal and boundary areas, at operation S310.

According to the exemplary embodiments of the present invention, an apparatus and a method for revising a halftoned image, and an image forming apparatus using the same, divides an input image into internal and boundary areas, and rearranges dots so that every pixel of the boundary area is represented in color. As a result, the image has a more smoothly represented boundary area.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An apparatus for revising a halftoned image comprising:
    an area dividing unit to detect a boundary area and an internal area of an image;
    a halftoning unit to convert the image to a halftoned image; and
    a dot rearranging unit to rearrange dots of the boundary area of the halftoned image respective,
    wherein the halftoning unit performs a same halftoning operation to the boundary area and the internal area.

2. The apparatus of claim 1, wherein the area dividing unit divides the image into the boundary area and an internal area.

3. The apparatus of claim 2, wherein the halftoning unit comprises:
    a boundary area halftoning unit to convert the boundary area of the image to halftones; and
    an internal area halftoning unit to convert the internal area of the image to halftones.

4. The apparatus of claim 1, wherein:
the boundary area of the halftoned image comprises a colored pixel and an adjacent white pixel; and
the dot rearranging unit moves a portion of the dots of the colored pixel to the white pixel.

5. The apparatus of claim 1, further comprising an output unit to output the final image.

6. The apparatus of claim 1, wherein the image is a color image.

7. The apparatus of claim 4, wherein the portion of the dots comprises dots of the same color.

8. The apparatus of claim 4, wherein the portion of dots comprises dots of different colors.

9. A method to revise a halftoned image, comprising:
detecting a boundary area and an internal area of an image;
converting the image to a halftoned image; and
rearranging dots of the boundary area of the halftoned image,
wherein the converting performs a same halftoning operation to the boundary area and the internal area.

10. The method of claim 9, wherein the detecting of the boundary area comprises dividing the image into the boundary area and an internal area.

11. The method of claim 10, wherein the converting of the image comprises:
converting the boundary area of the image to halftones; and
converting the internal area of the image to halftones.

12. The method of claim 9, wherein:
the boundary area of the halftoned image comprises a colored pixel and an adjacent white pixel; and
the rearranging of the dots comprises moving a portion of the dots from the colored pixel to the white pixel.

13. The method of claim 9, further comprising outputting the final image.

14. The method of claim 12, wherein the portion of the dots comprises dots of the same color.

15. The method of claim 12, wherein the portion of the dots comprises dots of different colors.

16. An image forming apparatus comprising:
an area dividing unit to detect a boundary area and an internal area of an image;
a halftoning unit to convert the image to a halftoned image; and
a dot rearranging unit to rearrange dots between a colored pixel and a white pixel of a boundary area of a halftoned image; and
a printing unit to print out the halftoned image,
wherein the halftoning unit performs a same halftoning operation to the boundary area and the internal area.

17. The image forming apparatus of claim 16, wherein:
the colored pixel comprises dots of a first color and dots of a second color; and
the dot rearranging unit moves the dots of the first color from the colored pixel to the white pixel.

\* \* \* \* \*